(No Model.)

A. MUIR.
METALLIC COLLAR.

No. 427,887. Patented May 13, 1890.

WITNESSES:
E. B. Bolton
E. L. Richards

INVENTOR:
Alfred Muir
By Richards &
his Attorneys.

THE NORRIS PETERS CO., PHOTO-LITHO., WASHINGTON, D. C.

UNITED STATES PATENT OFFICE.

ALFRED MUIR, OF MANCHESTER, COUNTY OF LANCASTER, ENGLAND.

METALLIC COLLAR.

SPECIFICATION forming part of Letters Patent No. 427,887, dated May 13, 1890.

Application filed April 2, 1890. Serial No. 346,297. (No model.)

*To all whom it may concern:*

Be it known that I, ALFRED MUIR, a subject of the Queen of Great Britain, and a resident of Manchester, in the county of Lancaster, England, have invented a certain new and useful Collapsible and Expansible Collar or Washer, of which the following is a specification.

My invention consists in a collapsible and expansible collar or washer made in, say, two parts, which are so combined as to be capable of adjustment axially, whereby the thickness of the collar or washer can be diminished or increased as desired.

Figure 1:
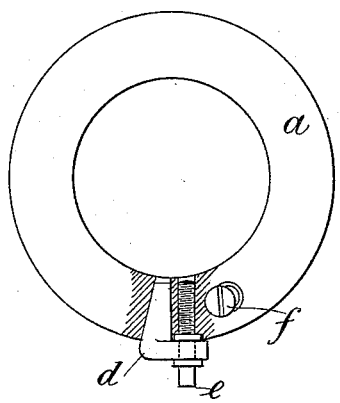
Figure 4:
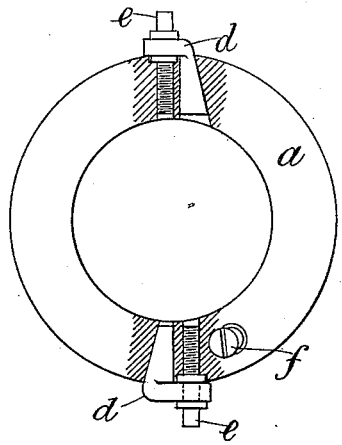
Figure 2:
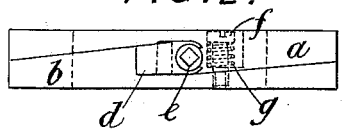
Figure 5:
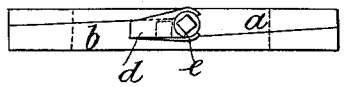
Figure 3:
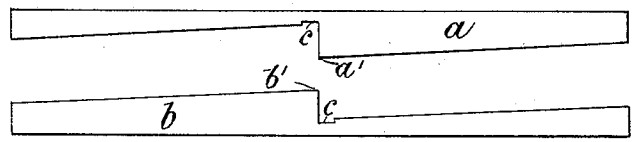
Figure 6:
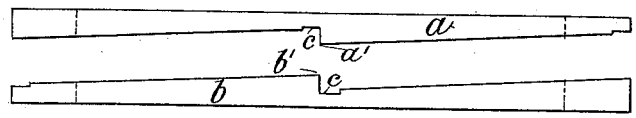

In the accompanying drawings, Figure 1 is a plan, partly in section, and Fig. 2, an edge view, of one form of collapsible and expansible collar or washer constructed according to my invention; and Fig. 3 is a detail view, on a larger scale, of the two parts of the collar disconnected. Figs. 4, 5, and 6 are similar views to Figs. 1, 2, and 3, respectively, showing another construction of the collar.

Referring first to Figs. 1, 2, and 3, the collar or washer is shown made in two parts $a$ and $b$, the adjoining faces of which are oppositely beveled or spirally inclined, so that when united the two parts $a$ and $b$ together form a collar or washer of uniform thickness throughout.

A portion of the metal is removed, as shown best at $c$, Fig. 3, behind each tooth or heel $a'$ $b'$, formed by the junction of the thickest and thinnest portions of the spiral inclines on the parts $a$ and $b$, and in the space $c$ thus formed is fitted a wedge or taper key $d$. The base or widest portion of the wedge $d$ projects beyond the periphery of the collar, as shown in Fig. 1, and has a slotted extension embracing a stud $e$, which screws into one of the parts $a$ $b$.

The parts $a$ and $b$ are held together by means of a small screw $f$, which passes freely through a slotted recess in the part $a$ and screws into a threaded hole in the part $b$. A spiral spring $g$, coiled on the screw $f$, is compressed between the bottom of the recess in the part $a$ and the head of the screw $f$, so that the parts $a$ and $b$ although held together can yet be moved axially within certain limits.

When the parts are in the relative positions indicated on Figs. 1 and 2, the collar or washer has its maximum thickness. To reduce the thickness, the wedge $d$ is drawn outward by turning the screwed stud $e$, and thereby allowing the two teeth or heels $a'$ $b'$ to be brought nearer together, which has the effect desired.

In the alternative construction illustrated by Figs. 4, 5, and 6 each part $a$ $b$ of the collar has two spirally-inclined surfaces instead of one, as in the previous construction. This permits the use of two wedges or taper keys $d$, with screwed studs $e$, the wedges being set in opposite directions, as shown, but otherwise there is no substantial difference. This arrangement of the wedges $d$ admits of the positive contraction or expansion of the collar or washer. Again, instead of the wedges $d$, any suitable mechanical equivalent—such as a screw passing through lugs—may be employed to adjust the thickness of the collar or washer. Similarly three or more inclined surfaces on each part $a$ $b$, in combination with any suitable number of wedges or taper keys, might be employed, either all set in the same direction or some in one and some in the other.

What I claim as my invention, and desire to secure by Letters Patent of the United States, is—

1. A collapsible and expansible collar or washer made in, say, two parts having their adjoining faces oppositely inclined, in combination with means—such as a wedge or wedges—for maintaining said parts in their relative axial positions, and for effecting their adjustment in order to vary the thickness of the collar or washer as required.

2. The combination, with the parts $a$ and $b$, having their adjoining faces inclined, of the wedges $d$ and screwed studs $e$, substantially as and for the purposes herein set forth.

In testimony that I claim the foregoing as my invention I have signed my name, in presence of two witnesses, this 5th day of March, 1890.

ALFRED MUIR.

Witnesses:
S. W. GILLETT,
HERBT. ROWLAND ABBEY.